2,848,459
CARBAMIC ACID ESTERS

Edward J. Pribyl, Metuchen, and William A. Lott, Maplewood, N. J., assignors to Olin Mathieson Chemical Corporation, New York, N. Y., a corporation of Virginia No Drawing. Application April 25, 1957
Serial No. 654,988

19 Claims. (Cl. 260—340.2)

This invention relates to new carbamic acid esters and more particularly to the mono- and dicarbamates of 2,2-dichloro-1-aryl-1,3-propanediols.

The compounds of this invention may be represented by the formula

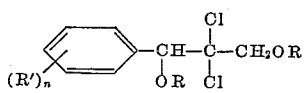

wherein one R is carbamyl and the other R is hydrogen or carbamyl, R' is selected from the group consisting of hydrogen, lower alkyl, lower alkoxy, halogen, and trifluoromethyl, and $n$ is a positive integer less than three. These compounds possess unique spinal cord depressant activity and thus may be used as muscle relaxants for spastic conditions. For such purposes they are formulated in tablets, capsules, or elixirs and are administered orally.

The compounds of this invention are prepared by the process of this invention which entails a series of steps. To prepare the free 2,2-dichloro-1-aryl-1,3-propanediols, whose method of manufacture has never heretofore been disclosed, an ester of an aroyl acetic acid of the formula

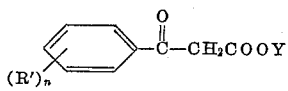

wherein Y is an organic radical, such as a lower alkyl (e. g. methyl or ethyl) group, and R' and $n$ are as hereinbefore defined, is treated with a chlorinating agent, such as sulfuryl chloride, to yield the corresponding ester of an aroyldichloroacetic acid. This reaction is most advantageously effected under anhydrous conditions at an elevated temperature (e. g. a temperature in the range of about 80° C. to about 90° C.) employing an equimolecular quantity of sulfuryl chloride. The ketoester, thus formed, is then reduced to a dihydric alcohol by reaction with a hydrogenating agent such as lithium aluminum hydride. This second reaction is optimally conducted at an elevated temperature (such as reflux temperature) in an anhydrous organic solvent (e. g. ether).

Among the suitable starting materials for this series of reactions may be mentioned the esters (e. g. ethyl esters) of benzoylacetic acid; (lower alkyl)benzoylacetic acids (e. g. m-toloylacetic acid, o,p-xyloylacetic acid, p-tert-butyl-benzoylacetic acid and p-ethylbenzoylacetic acid); (lower alkoxy)benzoylacetic acids (e. g. p-anisoylacetic acid, p-ethoxybenzoylacetic acid, and o,o-dimethoxybenzoylacetic acid); halobenzoylacetic acids (e. g. p-chlorobenzoylacetic acid, o-chlorobenzoylacetic acid and p-bromobenzoylacetic acid), trifluoromethylbenzoyl acetic acids. In most instances these starting materials are known. In those cases where they are new, they can be prepared by condensing the desired R'-substituted benzoic acid ester with an ester of acetic acid, employing a basic substance, such as sodium ethoxide, as a catalyst. These compounds can also be prepared by condensation of an R'-substituted benzoyl halide with an ester of acetoacetic acid and alkaline hydrolysis of the resulting aroylacetoacetate.

The free 1,3-diols can then be converted to the corresponding carbamate esters directly by reacting with phosgene, for example, in the presence of an acid acceptor base such as antipyrine and treating with aqueous or liquid ammonia. The preferred process, however, involves two steps wherein the free 1,3-diol is first reacted with phosgene to form the 1,3-cyclic carbonic acid ester, a compound which may be represented by the formula

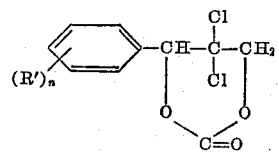

wherein R' and $n$ are as above defined. The cyclic carbonate is then treated with ammonia (either aqueous or liquid) to form the carbamic acid ester of the starting diol. The reaction is preferably conducted in the cold employing liquid ammonia as the reactant. The nature of the carbamate formed will depend on the quantity and method of addition of the reactants. Thus, if one mole of phosgene is added to one mole of the diol, a cyclic carbonate is formed, which upon treatment with liquid or aqueous ammonia gives a 3-monocarbamate as the principal product; whereas if one mole of diol is added to two or more moles of a phosgene solution, then the isolated bis-1,3-chlorocarbonate gives upon treatment with liquid or aqueous ammonia a 1,3-dicarbamate as the main product.

The process of this invention is illustrated by the following examples (all temperatures being in centigrade):

EXAMPLE 1

2,2-dichloro-1-phenyl-1,3-propanediol 3-monocarbamate (a) Benzoyldichloroacetic acid, ethyl ester.—135 g. (1 mole) of sulfuryl chloride is added dropwise with stirring to 96 g. (0.5 mole) of ethyl benzoylacetate over a 30-minute period at 25–30° C. The reaction mixture is then stirred at room temperature for one hour and finally warmed at 80–90° until evolution of hydrogen chloride ceases which usually requires about 3 hours. After standing overnight the reaction mixture is taken up in 300 ml. of ether and the ethereal solution is washed with four 100-ml. portions of water, four 100-ml. portions of 2% saturated sodium bicarbonate solutions and finally with a 2×100 ml. portion of water. At this point the washings are neutral. The ethereal layer is dried, filtered and the ether distilled. The residue is distilled in vacuo to give about 114 g. (87%) of the desired product boiling between about 109–112° C. at 0.3 mm. $n_D^{19}$ 1.5338.

Calcd. $C_{11}H_{10}Cl_2O_3$: Cl, 27.17. Found: Cl, 27.05.

(b) 2,2-dichloro-1-phenyl-1,3-propanediol.—A solution of 104.5 g. (0.40 mole) of benzoyldichloroacetic acid, ethyl ester in 600 ml. anhydrous ether is added dropwise with stirring to a solution of 18.5 g. (0.48 mole) of lithium aluminum hydride in 1500 ml. anhydrous ether at such a rate that gentle refluxing is maintained throughout the addition. The mixture is stirred for 2 hours, cooled in an ice-bath and decomposed by cautiously adding 100 ml. wet ether followed by 150 ml. water to decompose the excess lithium aluminum hydride. A cold solution (1500 ml.) of 10% sulfuric acid is added dropwise over a period of 2 hours. The ether solution is separated, and washed three times with 200 ml. saturated sodium chloride solution and twice with 200 ml. of water. The ether layer is dried over magnesium sulfate, filtered and the ether removed by distillation. The residue is purified by recrystallization from 300 ml. benzene to give about 53 grams (60%) of the desired material melding between about 107–108° C.

Calculated $C_9H_{10}Cl_2O_2$: C, 48.89; H. 4.56; Cl, 32.07. Found: C, 49.19; H, 4.64; Cl, 31.63.

(c) *2,2-dichloro-1-phenyl-1,3-propanediol cyclocarbonate.*—A cooled solution of 20 g. of phosgene in 200 ml. of toluene is added with stirring to a cooled solution of 44 g. of 2,2-dichloro-1-phenyl-1,3-propanediol and 76 g. of antipyrine in 300 ml. of chloroform. After standing overnight the solid that separated is collected and suspended in 600 ml. of water, stirred and filtered. This material is recrystallized from an acetone-water mixture to give about 27 g. of material, M. P. about 163–164°.

(d) *2,2-dichloro-1-phenyl-1,3-propanediol 3 - carbamate.*—A mixture of 27 g. of the cyclic carbonate obtained in section c and 60 ml. of liquid ammonia is cooled in an acetone-Dry Ice bath for six hours, then allowed to warm slowly and to evaporate overnight. The residue is re-crystallized from 50% aqueous alcohol to give about 18 g. of the monocarbamate ester melting between about 121–123°. A small amount of the 1-carbonate isomer (M. P. about 101–103°) is obtained when the filtrate is concentrated.

EXAMPLE 2

*2-2-dichloro-1-phenyl-1,3-propanediol 1,3-dicarbamate*

A cold solution of 41.8 g. antipyrine and 23 g. 2,2-dichloro-1-phenyl-1,3-propanediol in 120 ml. chloroform is added dropwise to 21.6 g. phosgene in 130 ml. toluene at −10° C. After standing overnight the antipyrine hydrochloride and some cyclic carbonate are filtered and the filtrate concentrated to remove the chloroform and toluene. The residue is treated with 25 g. liquid ammonia in the cold with stirring for five hours and then allowed to warm slowly to remove excess ammonia. The residue is recrystallized from aqueous alcohol to give about 9 g. of a white crystalline material melting between 136–138° C.

EXAMPLE 3

*2,2-dichloro-1-p-ethoxyphenyl-1,3-propanediol 3-monocarbamate*

(a) *p-Ethoxybenzoyldichloroacetic acid, ethyl ester.*— 67 g. (0.5 mole) of sulfuryl chloride is added dropwise with stirring to 59 g. (0.25 mole) of ethyl p-ethoxybenzoyl acetate over a 30-minute period at 25–30° C. After stirring at room temperature for one hour the reaction mixture is warmed to 80–90° and held at this temperature for 2 hours. After standing overnight the mixture is extracted with 2×200 ml. of ether and the ethereal solutions combined washed with water and 2% $NaHCO_3$ solution as described in Example 1, section a. The ethereal layer is dried, filtered and the ether distilled. The residue is distilled to give about 61 g. of material.

(b) *2,2-dichloro - 3-p-ethoxyphenyl-1,3-propanediol.*— A solution of 47.2 g. (0.20 mole) or p-ethoxybenzoyldichloroacetic acid, ethyl ester in 300 ml. of anhydrous ether is added dropwise with stirring to a solution of 9.25 g. (0.24 mole) of lithium aluminum hydride in 700 ml. of anhydrous ether at such a rate that gentle refluxing is maintained throughout the addition. After stirring for two hours, the reaction mixture is worked up as described in Example 1, section b, to give about 30 g. of material.

(c) *2,2-dichloro-1-p-ethoxyphenyl-1,3-propanediol cyclocarbonate.*—A cooled solution of 9.9 g. of phosgene in 150 ml. of toluene is added with stirring to a cooled solution of 26.5 g. of 2,2-dichloro-1-p-ethoxyphenyl-1,3-propanediol and 37 grams of antipyrine in 150 ml. of chloroform. After standing overnight the solid that separates is collected, suspended in 400 ml. of water, stirred and filtered. The solid is dried and recrystallized from an acetone-water solution to give about 15 g. of material.

(d) *2,2-dichloro-1-p-ethoxyphenyl-1,3-propanediol 3-carbamate.*—A mixture of 14 g. of the cyclic carbonate obtained in section c and 30 ml. of liquid ammonia is cooled in an acetone-Dry Ice bath for six hours and then allowed to warm slowly to evaporate the excess ammonia. The residue is recrystallized from benzene to give about 10 g. of a white crystalline material.

EXAMPLE 4

*2,2-dichloro-p-tert-butylphenyl - 1,3 - propanediol 3-carbamate*

(a) *Ethyl p-tert-butylbenzoylacetate.*—A mixture of 195 g. (1.5 moles) of ethyl acetoacetate and 34.5 g. sodium in 3 liters of benzene is refluxed for 20 hours. The mixture is cooled and 335 g. (1.7 moles) p-tert-butylbenzoyl chloride is added over a two-hour period and then refluxed for 6 hours, cooled by the addition of ice and shaken. The benzene layer is separated, washed with 5% sodium bicarbonate solution and dried. The benzene is distilled off and the residue gives about 202 g. of ethyl p-tert-butylbenzoylacetoacetate.

62 g. (0.25 mole) of this material is added to a solution of 32 g. ammonium chloride in 150 ml. water at 40° and kept at this temperature for 15 minutes and cooled rapidly. The solution is extracted with 200 ml. of ether and the extracts dried. After distilling the ether, the residue is distilled in vacuo to give ethyl p-tert-butylbenzoylacetate.

(b) *p-Tert-butylbenzoyldichloroacetic acid, ethyl ester.*—Following the procedure of section a of Example 1, but substituting ethyl p-tert-butylbenzoylacetate for the ethyl benzoylacetate, there is obtained p-tert-butylbenzoyldichloroacetic acid ethyl ester.

(c) *2,2-dichloro - 1 - (p-tert-butylphenyl)-1,3-propanediol.*—Following the procedure of section b of Example 1, but substituting p-tert-butylbenzoyldichloroacetic acid ethyl ester for the benzoyldichloroacetic acid ethyl ester, there is obtained 2,2-dichloro-1-(p-tert-butylphenyl)-1,3-propanediol.

(d) *2,2-dichloro-1-(p-tert-butylphenyl) - 1,3 - propanediol cyclocarbonate.*—Following the procedure of section c of Example 1, but substituting 2,2-dichloro-1-(p-tert-butylphenyl)-1,3-propanediol for the 2,2-dichloro-1-phenyl - 1,3 - propanediol, 2,2 - dichloro - 1-(p-tert-butylphenyl)-1,3-propanediol cyclocarbonate is produced.

(e) *2,2-dichloro-1-(p-tert-butylphenyl) - 1,3 - propanediol-3-carbamate.*—Following the procedure of section d of Example 1, but substituting 2,2-dichloro-1-(p-tert-butylphenyl)-1,3-propanediol cyclocarbonate for the cyclocarbonate employed therein, 2,2-dichloro-1-(p-butylphenyl)-1,3-propanediol 3-carbamate is formed as the major product.

(f) *2,2-dichloro-1-(p-tert-butylphenyl) - 1,3 - propanediol 1,3-dicarbamate.*—Following the procedure of Example 2, but substituting 2,2-dichloro-1-(p-tert-butylphenyl)-1,3-propanediol for the 2,2-dichloro-1-phenyl-1,3-propanediol, there is obtained 2,2-dichloro-1-(p-tert-butylphenyl)-1,3-propanediol 1,3-dicarbamate.

Similarly, by substituting other substituted benzoyl chlorides for the p-tert-butylbenzoyl chloride in the procedure of section a of Example 4, and then following the procedures of sections b, c, d, e and f of Example 4, the corresponding carbamic acid esters are obtained. Thus, the acid chlorides of m-toluic acid, o,p-xyloic acid, p-methoxybenzoic acid, o,o-dimethoxybenzoic acid, p-chlorobenzoic acid, and p-trifluoromethylbenzoic acid yield the 3-carbamic acid esters and 1,3-dicarbamic acid esters of 2,2-dichloro-1-m-tolyl-1,3-propanediol, 2,2-dichloro-1-o,p-xylyl-1,3-propanediol, 2,2-dichloro-p-anisyl-1,3-propanediol, 2,2-dichloro-o,o-dimethoxyphenyl - 1,3-propanediol, 2,2-dichloro-p-chlorophenyl-1,3 - propanediol, and 2,2-dichloro-p-trifluoromethylphenyl-1,3-propanediol, respectively.

The invention may be otherwise embodied within the scope of the appended claims.

What is claimed is:

1. A compound of the formula

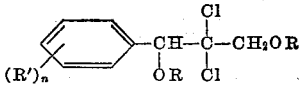

wherein one R is carbamyl and the other R is selected from the group consisting of hydrogen and carbamyl, R' is selected from the group consisting of hydrogen, lower alkyl, lower alkoxy, halogen and trifluoromethyl, and $n$ is a positive integer less than three.

2. 2,2-dichloro-1-phenyl-1,3-propanediol 3-carbamate.
3. 2,2-dichloro-1-phenyl-1,3-propanediol 1,3-dicarbamate.
4. 2,2-dichloro-1-(lower alkoxy)phenyl-1,3-propanediol 3-carbamate.
5. 2,2-dichloro-1-(lower alkyl)phenyl-1,3-propanediol 3-carbamate.
6. 2,2-dichloro-1-(p-tert.-butylphenyl)-1,3-propanediol 3-carbamate.
7. 2,2-dichloro-1-(lower alkyl)phenyl-1,3-propanediol 1,3-dicarbamate.
8. A method for preparing a compound of the formula

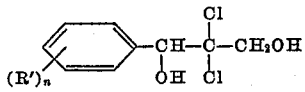

wherein R' is selected from the group consisting of hydrogen, lower alkyl, lower alkoxy, halogen and trifluoromethyl and $n$ is a positive integer less than three, which comprises interacting an ester of a compound of the formula

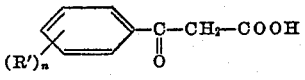

wherein R' and $n$ are as above defined, with a chlorinating agent to form the $\alpha,\alpha$-dichloroacetic acid ester derivative, and treating the latter compound with a hydrogenating agent.

9. The process of claim 8 wherein the chlorinating agent is sulfuryl chloride.
10. The process of claim 9 wherein the hydrogenating agent is lithium aluminum hydride.
11. The process of claim 10 wherein the ester reactant is an ester of benzoylacetic acid and 2,2-dichloro-1-phenyl-1,3-propanediol is recovered.
12. A compound of the formula

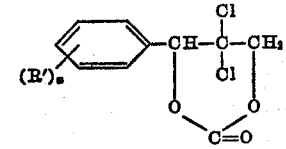

wherein R' is selected from the group consisting of hydrogen, lower alkyl, lower alkoxy, halogen and trifluoromethyl, and $n$ is a positive integer less than three.

13. 2,2-dichloro-1-phenyl-1,3-propanediol 1,3-cyclocarbonate.

14. A method for preparing a compound of the formula

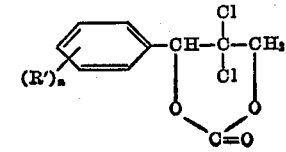

wherein R' is selected from the group consisting of hydrogen, lower alkyl, lower alkoxy, halogen and trifluoromethyl, and $n$ is a positive integer less than three, which comprises interacting a compound of the formula

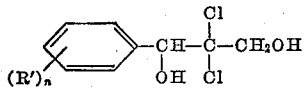

wherein R' and $n$ are as above defined, with phosgene and recovering the resultant cyclic carbonate.

15. The process of claim 14, wherein the reactant is 2,2-dichloro-1-phenyl-1,3-propanediol.

16. A method for preparing a compound of the formula

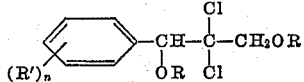

wherein at least one R is carbamyl, R' is selected from the group consisting of hydrogen, lower alkyl, lower alkoxy, halogen and trifluoromethyl, and $n$ is a positive integer less than three, which comprises interacting a compound of the formula

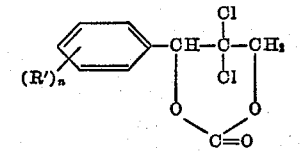

wherein R' and $n$ are as above defined, with ammonia and recovering the resultant product.

17. The process of claim 16 wherein the reaction is conducted in the cold and liquid ammonia is employed as the source of ammonia.

18. The process of claim 17 wherein the reactant is 2,2-dichloro-1-phenyl-1,3-propanediol 1,3-cyclocarbonate.

19. The process of claim 16, wherein the cyclic carbonate reactant is prepared by reacting a compound of the formula

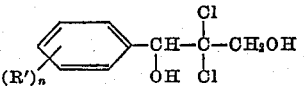

wherein R' is selected from the group consisting of hydrogen, lower alkyl, lower alkoxy, halogen and trifluoromethyl and $n$ is a positive integer less than three, with phosgene.

References Cited in the file of this patent

UNITED STATES PATENTS

| | | |
|---|---|---|
| 2,587,641 | Moersch et al. | Mar. 4, 1952 |
| 2,656,378 | Berger et al. | Oct. 20, 1953 |
| 2,686,788 | Moore et al. | Aug. 17, 1954 |
| 2,724,720 | Berger et al. | Nov. 22, 1955 |

FOREIGN PATENTS

| | | |
|---|---|---|
| 192,763 | Spain | Apr. 29, 1950 |

OTHER REFERENCES

A. J. Krajkeman: Manufacturing Chemist, vol. 22, No. 4, pages 47–56, April 1951.

Romeo B. Wagner and Harry D. Zook: Synthetic Organic Chemistry, John Wiley, New York, pages 102–103 (1953).